United States Patent
Baughman et al.

(10) Patent No.: US 10,109,214 B2
(45) Date of Patent: Oct. 23, 2018

(54) COGNITIVE BIAS DETERMINATION AND MODELING

(71) Applicant: International Business Machines Corporation, Armonk, NY (US)

(72) Inventors: Aaron K. Baughman, Silver Spring, MD (US); James R. Kozloski, New Fairfield, CT (US); Timothy M. Lynar, Kew (AU); Suraj Pandey, Park Orchards (AU); John M. Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 14/640,155

(22) Filed: Mar. 6, 2015

(65) Prior Publication Data

US 2016/0260341 A1    Sep. 8, 2016

(51) Int. Cl.
   *G09B 7/00*    (2006.01)
   *G09B 5/00*    (2006.01)

(52) U.S. Cl.
   CPC .................... *G09B 7/00* (2013.01); *G09B 5/00* (2013.01)

(58) Field of Classification Search
   CPC .................... G09B 5/00; G09B 7/00
   USPC ....................................... 434/322
   See application file for complete search history.

(56) References Cited

U.S. PATENT DOCUMENTS

| | | |
|---|---|---|
| 8,549,629 B1 | 10/2013 | McCreesh et al. |
| 8,589,332 B2 | 11/2013 | Brooks et al. |
| 2005/0186550 A1 | 8/2005 | Gillani |
| 2010/0198768 A1 | 8/2010 | Zhou et al. |
| 2011/0212430 A1* | 9/2011 | Smithmier ............... G09B 5/06 434/322 |
| 2012/0259240 A1 | 10/2012 | Llewellynn et al. |
| 2013/0311925 A1 | 11/2013 | Denker et al. |

FOREIGN PATENT DOCUMENTS

| | | |
|---|---|---|
| EP | 1826688 A3 | 1/2008 |
| WO | 2006036328 A1 | 4/2006 |

OTHER PUBLICATIONS

Bharathy, et al., "Holistically evaluating agent-based social systems models: a case study", Simulation, vol. 89, Issue 1, © 2012, The Society for Modeling and Simulation International, Jan. 2013.
Cole, et al., "Tagging Semantics: Investigations with WordNet", Jun. 16-20, 2008, JCDL '08, Proceedings of the 8th ACM/IEEE-CS joint conference on Digital Libraries.

(Continued)

*Primary Examiner* — Robert P Bullington
(74) *Attorney, Agent, or Firm* — Christopher K. McLane; Daniel R. Simek

(57) ABSTRACT

In an approach for determining a preferred learning style of the user, a computer receives user information of a user. The computer collects data for user model development, wherein data includes actions performed by the user. The computer creates one or more associations between actions in the collected data for user model development and received user information. The computer determines a preferred learning style of the user based on the created one or more associations.

20 Claims, 5 Drawing Sheets

(56) References Cited

OTHER PUBLICATIONS

Hudlicka, et al., "Assessment of User Affective and Belief States for Interface Adaptation: Application to an Air Force Pilot Task", User Modeling and User-Adapted Interaction, vol. 12, Issue, 1, Feb. 2002, © 2002 Kluwer Academic Publishers.
Nguyen, et al., "Instantaneous Frequency and Amplitude Modulation of EEG in the Hippocampus Reveals State Dependent Temporal Structure", Engineering in Medicine and Biology Society, Aug. 20-24, 2008, EMBS 2008, 30th Annual International Conference of the IEEE, pp. 1711-1715.
Shi, et al, "The Impact of Individual and Team Goals on Human Distributed Dynamic Decisionmaking: A Mathematical Model", American Control Conference, 1992, pp. 1976-1977.
Tsianos, et al., "Enhancing eLearning Environments with Users' Cognitive Factors: The case of EKPAIDEION", The 7th European Conference on e-Learning, pp. 877, Nov. 2008.
Weng, et al., "A Flexible Conversational Dialog System for MP3 Player", Oct. 2005, Proceedings of HLT/EMNPLP Demonstration Abstracts, pp. 24-25.

* cited by examiner

COGNITIVE BIAS DETERMINATION AND MODELING

BACKGROUND OF THE INVENTION

The present invention relates generally to the field of data analysis, and more particularly to modeling based on user biases.

Computing systems are utilized by individuals for a variety of purposes, such as; performing work, communicating, storing information, calculating data, entertainment, and convenience. Therefore, based upon achieving one or more specific purposes within the computing system, users interact with multiple different software applications (e.g., email, Internet browsers, word processors, etc.). While varying purposes may dictate the specific software applications a user utilizes within the computing systems, the manner in which users interact with the computing systems varies based on the individual. Individual users consume and manipulate information supplied by the software applications in different manners based upon preferred learning styles. Learning styles encompass an individuals' natural or habitual pattern of acquiring, processing, and responding to information in learning situations (e.g., visual, verbal, active, sequential, intuitive, etc.).

Regardless of an individual's preferred learning style, users can utilize a common utility, such as a clipboard in conjunction with a clipboard manager, while performing tasks on a computing systems. The clipboard is a set of functions and messages that enables application software to transfer data. As all applications have access to the clipboard, data can be easily transferred between and/or within an application. The clipboard manager is a computer program that adds functionality to the clipboard of an operating system. Clipboard managers enhance the basic functions of cut, copy and paste operations with one or more features such as multiple buffers and the ability to merge, split, and edit contents, selecting the buffer to store data from a cut or copy, selecting the buffer the paste data should be retrieved from, handling formatted text, tabular data, data objects, media content and uniform resource locators (URLs), saving copied data to long term storage, indexing and/or tagging clipped data, and searching saved data.

To determine information regarding users and learning styles, data mining techniques are utilized. The data mining techniques analyze large quantities of data to extract previously unknown patterns utilizing techniques such as cluster analysis, anomaly detection, and association rule mining (i.e., dependencies). The extracted information is then transformed into an understandable structure comprised of patterns and knowledge for further use.

SUMMARY

Aspects of the present invention disclose a method, computer program product, and system for determining a preferred learning style of the user. The method includes one or more computer processors receiving user information of a user. The method further includes one or more computer processors collecting data for user model development, wherein data includes actions performed by the user. The method further includes one or more computer processors creating one or more associations between actions in the collected data for user model development and received user information. The method further includes one or more computer processors determining a preferred learning style of the user based on the created one or more associations.

DETAILED DESCRIPTION

As recognized by embodiments of the present invention, different users manipulate, consume, and represent information based upon a preferred learning style. Embodiments of the present invention further recognize that by incorporating the learning styles of the users into the interactions that occur between users and computing systems, the learning experience and efficiency of the users may be maximized. Embodiments of the present invention gather and analyze user interactions between software applications and the clipboard that are available on computing systems to determine learning styles. Embodiments of the present invention then create models that represent the learning styles of the individual users and incorporate the models to dynamically change the information to best suit the needs of the users. Additionally, embodiments of the present invention compare the users to form groups of users based on similarities that then allows existing models (i.e., previously designed models) to be utilized by inexperienced users for whom individualized models do not exist.

Figure 1:
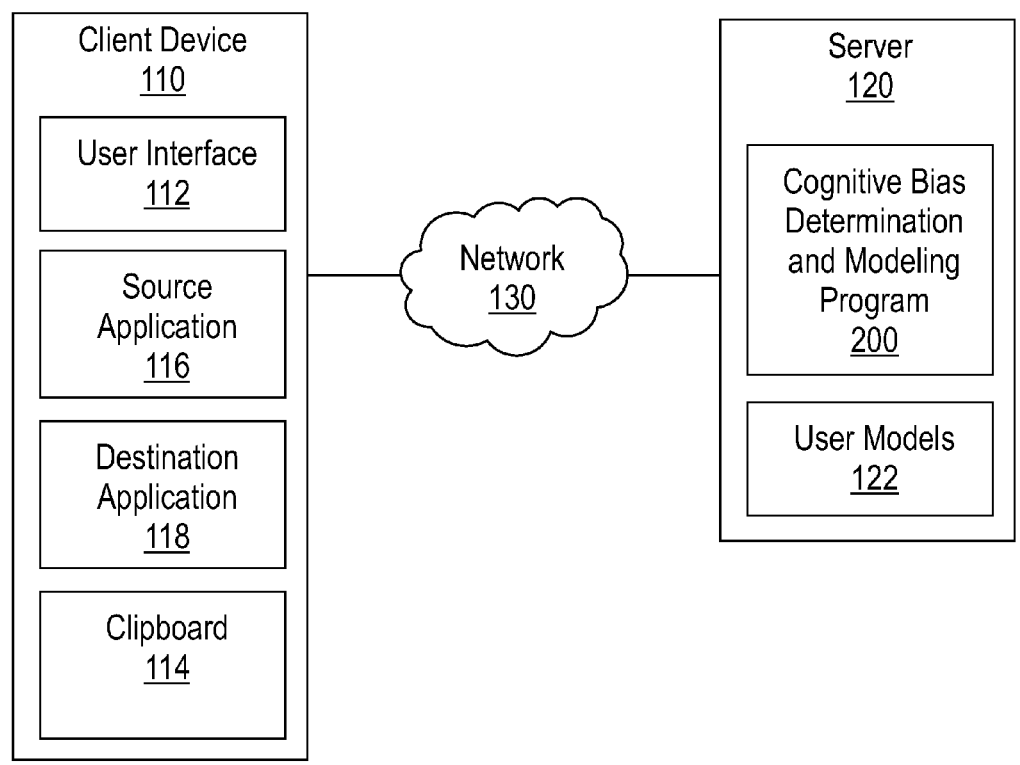
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110 and server 120 interconnected over network 130. Distributed data processing environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 3, in accordance with embodiments of the present invention. Client device 110 contains user interface 112, clipboard 114, source application 116, and destination application 118.

User interface 112 is a program that provides an interface between a user of client device 110 and a plurality of applications that reside on client device 110 (e.g., clipboard 114, source application 116, and destination application 118) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to clipboard 114, source application 116, destination application 118, and cognitive bias determination and modeling program 200.

Clipboard 114 is a set of functions and messages that enables the application software installed on client device 110 to transfer data. Clipboard 114 is user driven via user interface 112, and initiates in response to clipboard commands from the user, such as cut, copy, and paste (e.g., available through edit menus, shortcut keys, mouse actions, etc.). As the content of clipboard 114 changes through the use of clipboard commands, a clipboard sequence number is incremented relating to the tracking of information placed on clipboard 114. Clipboard 114 resides on client device 110 and is accessible by user interface 112, source application 116, destination application 118, and cognitive bias determination and modeling program 200.

Source application 116 and destination application 118 represent a plurality of application software that reside on client device 110. Application software is a program or group of programs that are designed for a user to carry out operations for a specific application (e.g., database programs, word processors, Web browsers, spreadsheets, e-mail, etc.). Source application 116 and destination application 118 are capable of sending and receiving information to clipboard 114 through the utilization of copy, cut, and paste functions. Source application 116 represents application software that a user selects information from by utilizing cut and/or copy functions of clipboard 114. Destination application 118 represents application software that a user designates to receive cut and/or copied information from clipboard 114 through the paste function. In the depicted embodiment, source application 116 and destination application 118 reside on client device 110. In other embodiments, source application 116 and destination application 118 may reside on other devices such as server 120, provided that source application 116 and destination application 118 are accessible to user interface 112, clipboard 114, and cognitive bias determination and modeling program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains user models 122 and cognitive bias determination and modeling program 200.

Cognitive bias determination and modeling program 200 is a computer program that analyzes the manner in which users extract and utilize information through application software (e.g., source application 116, destination application 118, and clipboard 114) to determine learning styles associated with the user. Additionally, cognitive bias determination and modeling program 200 creates user models 122 based on the learning styles of users. User models 122 are models that identify and employ methods to optimally deliver content to users in various forms such as modifying the layout of a webpage or specifying the content to be displayed, and may be tailored based upon information associated with the users (e.g., job role, demographics, profession, learning styles, etc.). Content may be modified through implicit, explicit, and/or hybrid personalization (e.g., a combination of implicit and explicit). Implicit personalization is performed based on a profile, behavior or collaboration, and explicit personalization encompasses changes implemented by the user through features provided by the system. Cognitive bias determination and modeling program 200 may then apply the created user models 122 to enhance the experience of existing users or newer users. User models 122 represent a collection of stored user models that continue to be updated and added to as new user models 122 are created, and existing user models 122 are updated by cognitive bias determination and modeling program 200. In the depicted embodiment, cognitive bias determination and modeling program 200 resides on server 120. In another embodiment, cognitive bias determination and modeling program 200 may reside on other devices such as client device 110. In other embodiments, cognitive bias determination and modeling program 200 may reside on other servers and client devices not shown, connected over network 130, provided cognitive bias determination and modeling program 200 has access to clipboard 114, source application 116 and destination application 118.

Network 130 may be a local area network (LAN), a wide area network (WAN) such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Figure 2:
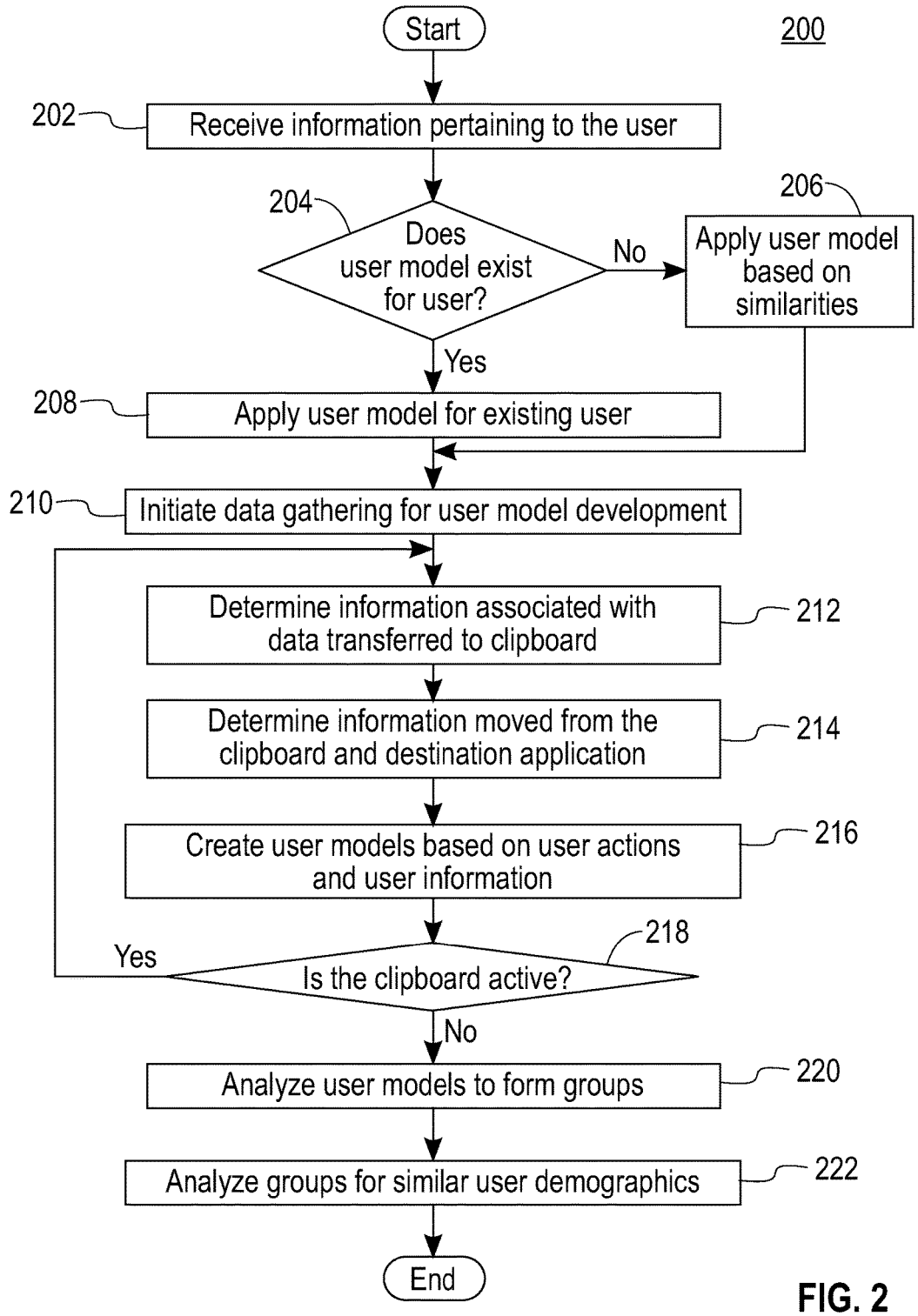
FIG. 2 is a flowchart depicting operational steps of a cognitive bias determination and modeling program, on a server within the distributed data processing environment of FIG. 1, for determining user learning styles and creating models, in accordance with an embodiment of the present invention.

FIG. 2 is a flowchart depicting operational steps of cognitive bias determination and modeling program 200, a program for determining user learning styles and creating models, in accordance with an embodiment of the present invention. In a preferred embodiment, cognitive bias determination and modeling program 200 is an application running in the background on client device 110. In another embodiment, cognitive bias determination and modeling program 200 may be included as a background service as part of an operating system. In some embodiments, cognitive bias determination and modeling program 200 may be initiated or closed at any point per the discretion of the user.

In step 202, cognitive bias determination and modeling program 200 receives information pertaining to the user. Information pertaining to the user may include demographic information such as age, gender, education level, profession, job role, etc. In one embodiment, cognitive bias determination and modeling program 200 receives demographic user information based on input entered by the user via user interface 112. For example, cognitive bias determination and modeling program 200 provides the user with a request for demographic user information regarding demographics that the user may then choose to accept or decline. In the event the user accepts the request, cognitive bias determination and modeling program 200 provides the user with a series of questions regarding the user. Cognitive bias determination and modeling program 200 then receives responses provided by the user through user interface 112 that are stored for further use. However, the user may selectively choose which questions to answer, such as a user may select to answer questions regarding gender and level of education, but not age.

In another embodiment, cognitive bias determination and modeling program 200 receives information pertaining to the user based on public user information from a trusted source (e.g., user account, registration information, databases). For example within a company, cognitive bias determination and modeling program 200 extracts user IDs from the login information (e.g., at the time of log in, a user provides a user ID and password to link to a unique user account). Cognitive bias determination and modeling program 200 then searches a company database based on the user ID. From the company database, cognitive bias determination and modeling program 200 determines public user information pertaining to the user such as job role, title, department, peer group, etc. In another example, cognitive bias determination and modeling program 200 extracts the public user information from registration information initially entered by the user (e.g., information entered when creating a new user account or registering application software). In some other embodiment, cognitive bias determination and modeling program 200 receives demographic and public user information pertaining to the user based on a combination of user inputs and from one or more trusted sources.

In decision 204, cognitive bias determination and modeling program 200 determines whether user models 122 exist for the user. Cognitive bias determination and modeling program 200 searches user models 122 for matches based upon criteria identifying the user (e.g., user id, name, registration information, etc.). For example, previously user id jsmith utilizes cognitive bias determination and modeling program 200 resulting in the creation of user models 122 specifically for jsmith (i.e., jsmith user models 122 is stored with user id jsmith). User id jsmith logs into client device 110 the next morning and initiates cognitive bias and determination modeling program 200. Cognitive bias and determination modeling program 200 searches user models 122 for jsmith user models 122. Upon locating jsmith user models 122 within the overall repository of user models 122, cognitive bias determination and modeling program 200 determines an existing user models 122 is available for jsmith. If cognitive bias determination and modeling program 200 determines user models 122 exist for the user (decision 204, yes branch), then cognitive bias determination and modeling program 200 applies user models 122 for the existing user (step 208). If cognitive bias determination and modeling program 200 determines user models 122 do not exist for the user (decision 204, no branch), then cognitive bias determination and modeling program 200 applies user models 122 based upon similarities (step 206).

In step 206, cognitive bias determination and modeling program 200 applies user models 122 based on similarities. Cognitive bias determination and modeling program 200 utilizes the received information pertaining to the user (received in step 202) and searches stored user information associated with user models 122 to determine similarities. Cognitive bias determination and modeling program 200 may determine similarities based upon one or more user characteristics (e.g., demographics, job titles, level of education, profession, etc.) utilizing an algorithm to discern the most probable match (e.g., multiple iterations of matching combined with weighting factors to acquire an overall best match). For example, a new user initially supplies demographic information including age range of twenty to thirty five, experience of less than a year, and an occupation of mechanical engineer. Within user models 122, cognitive bias determination and modeling program 200 identifies user models 122 for engineers, financial analysts, and lawyers. Cognitive bias determination and modeling program 200 may then search within the engineering group for instances of user models 122 that match additional demographic information such as age range and experience to potentially provide a more relevant match. In another embodiment when demographic information is not provided, cognitive bias determination and modeling program 200 may determine similarities based upon general user information identified by a trusted source. For example a new hire within a department is assigned the same job title as an existing employee in the department, therefore cognitive bias determination and modeling program 200 determines the new hire and existing employee are similar based on job title and identifies instances of user models 122 that correspond to the existing employee and applies the user models 122 for the existing employee to the new hire for use.

In one embodiment after cognitive bias determination and modeling program 200 determines a match, cognitive bias determination and modeling program 200 may automatically apply the matching instances of user models 122 to the new user (e.g., applies existing user models 122 to the new user). In another embodiment after cognitive bias determination and modeling program 200 determines a match, cognitive bias determination and modeling program 200 may provide the user with an option to apply the matching instances of user models 122 or begin data gathering without applying user models 122 (e.g., allows creation of a new user models 122 or allows use and/or modification to an existing user models 122). In some other embodiment, cognitive bias determination and modeling program 200 does not determine a match, and applies general user models 122 (e.g., new instances of user models 122 without preference information, most common instances of existing user models 122). Additionally, the user may select to discontinue use of user models 122 at any point per the discretion of the user. Once cognitive bias determination and modeling program 200 applies user models 122, cognitive bias determination and modeling program 200 may modify the manner in which information is presented to users to accommodate preferred learning styles. For example, cognitive bias determination and modeling program 200 provides visual learners information incorporating additional graphics whereas a sequential learner receives similar information but as an ordered list with graphics removed and/or reduced.

In step 208, cognitive bias determination and modeling program 200 applies user models 122 for an existing user (i.e., applies existing user models 122 created by cognitive bias determination and modeling program 200 from a prior session of the user). Cognitive bias determination and modeling program 200 may modify the manner in which information is presented through user interface 112 to the existing user based on a preferred learning style noted within user models 122. The existing user may also select to discontinue use of user models 122 at any point per the discretion of the user.

In step 210, cognitive bias determination and modeling program 200, initiates data gathering for development of user models 122. Cognitive bias determination and modeling program 200 gathers data pertaining to user actions and software applications (e.g., source application 116 and destination application 118) that involve clipboard 114. Cognitive bias determination and modeling program 200 gathers data when clipboard 114 is active (e.g., application software is opened on client device 110 that utilizes clipboard 114, operating software activates clipboard 114, etc.). In the depicted embodiment, source application 116 and destination application 118 are both active (e.g., two different application software programs, such as a word processing document and a Web browser). In another embodiment, a single application is active and represents both source application 116 and destination application 118. For example, when working within a word processing application, more than one word processing document may be opened at a time and a user may interact with one or more of the opened documents.

In step 212, cognitive bias determination and modeling program 200 determines information associated with data transferred to clipboard 114. Cognitive bias determination and modeling program 200 determines information that source application 116 transfers to clipboard 114 upon receipt of the initiation of the cut and/or copy functions. For example, through user interface 112 a user highlights text within a word processing document (e.g., source application 116). The user then selects the cut and/or copy function that places the selected text on clipboard 114. Once the data transfers to clipboard 114, cognitive bias determination and modeling program 200 records and tracks the data transferred to clipboard 114 (e.g., text, image, hyperlink, etc.) and the type of program associated with source application 116 (e.g., word processing document, presentation, Web browser, etc.) for further use. In another embodiment, source application 116 may be unavailable, but cognitive bias determination and modeling program 200 infers source application 116 based upon the sequence and type of actions (e.g., cut and/or copy are associated with source application 116). For example, a user may select and copy an icon located on client device 110 rather than information displayed within application software.

In step 214, cognitive bias determination and modeling program 200 determines information associated with the transfer of data from clipboard 114 to destination application 118. Cognitive bias determination and modeling program 200 determines information originating from source application 116 transfers from clipboard 114 to destination application 118 upon receipt of the paste function. For example after copying a line of text, the user then selects the Web browser (e.g., destination application 118) and opens a search website. Through user interface 112 the user then initiates the paste function, thus placing the text residing on clipboard 114 into the search website. Once the data transfers from clipboard 114 to destination application 118, cognitive bias determination and modeling program 200 records information pertaining to destination application 118. For example, cognitive bias determination and modeling program 200 records the type of program (e.g., word processing document, presentation, Web browser, etc.), and may also include information regarding the utilization of the information such as where the information is placed within destination application 118 (e.g., search function, numbered list, document, rows and columns, etc.). In another embodiment, destination application 118 may be unavailable, but cognitive bias determination and modeling program 200 infers destination application 118 based upon the sequence and type of actions (e.g., paste functions are associated with destination application 118). For example, an image file may be pasted onto the desktop of client device 110, source application 116 may be image processing software, and destination application 118 is associated with as aspect of the operating system.

In step 216, cognitive bias determination and modeling program 200 creates user models 122 based on user actions and user information. Cognitive bias determination and modeling program 200 initiates the creation of user models 122 once information is initially placed upon clipboard 114. Cognitive bias and determination modeling program 200 examines the type of application software (e.g., source application 116, destination application 118) and utilization of the information transferred to and from clipboard 114 to create user models 122 that relate to style preferences (e.g., presentation styles, organizational styles, learning styles, etc.). Cognitive bias determination and modeling program 200 performs feature extraction on the copied data. Feature extraction starts from an initial set of data and builds derived values or features intended to be informative that facilitate learning and generalization. Cognitive bias determination and modeling program 200 then discerns salient topics from the extracted features through language resources such as knowledge bases and lexical resources (e.g., identifies semantic and syntactic information regarding the extracted features which may the present as clusters around a salient topic). Cognitive bias determination and modeling program 200 applies a density model over a cluster to determine a bias (e.g., learning style).

For example, a sports trainer is disappointed by the performance of a star player, and believes the poor performance is related to an injury of the back or knee. The sports trainer researches multiple sources for back and knee injuries. As the sports trainer accesses the returned results, the sports trainer copies back and knee injury information from the various Web pages to clipboard 114 and then pastes the information into a spreadsheet. Cognitive bias determination and modeling program 200 determines the principle words (e.g., salient topics) associated with "back injury" and "knee injury" through latent semantic analysis. The latent semantic analysis is a natural language processing technique for extracting and representing contextual-usage meaning of words from a collection of written texts that assumes words close in meaning such as homonyms and synonyms occur in similar pieces of written text. Within the copied and pasted information from clipboard 114, cognitive bias determination and modeling program 200 identifies the words spine, vertebral column, spondylolisthesis, cervical radiculopathy, patella, popliteal, meniscus, and anterior cruciate ligament (ACL). Cognitive bias determination and modeling program 200 then clusters the principle words based on definition similarities found in an online dictionary. Therefore search results associated with "back" such as spine, vertebral column, spondylolisthesis, and cervical radiculopathy comprise one cluster and search results associated with "knee" such as patella, popliteal, meniscus, and ACL comprise another cluster. Cognitive bias determination and modeling program 200 determines a cluster density based on the density of the cluster relative to an individual principle word (e.g., individual densities are associated with spine, vertebral column, spondylolisthesis, and cervical radiculopathy). Cognitive bias determination and modeling program 200 then determines a relative density that ranks the potential cognitive biases of back injuries and knee injuries.

In one embodiment, cognitive bias determination and modeling program 200 builds a new user models 122 for a new user (i.e., model does not exist already for the user, and user does not utilize similar existing user models 122). Cognitive bias determination and modeling program 200 builds a new user models 122 based solely on actions performed in current user session. In another embodiment, cognitive bias determination and modeling program 200 may modify existing user models 122 (e.g. new user utilizing an existing similar user models 122, current user utilizes the appropriate existing user models 122 specific to the current user). For example cognitive bias determination and modeling program 200 may apply user models 122 associated with an existing user from a prior session thus providing tailored information geared to the learning styles of the user. As the user performs additional actions, cognitive bias determination and modeling program 200 acquires additional information. Cognitive bias determination and modeling program 200 reevaluates the information with the additional information (e.g., performs feature extraction, discerns salient topics, and applies the density model). Cognitive bias determination and modeling program 200 may then improve user models 122 based on the reevaluated information for the existing user.

In decision 218, cognitive bias determination and modeling program 200 determines whether clipboard 114 is active. Cognitive bias determination and modeling program 200 determines clipboard 114 is active when the user of user interface 112 initiates additional cut, copy, and/or paste functions within source application 116 and/or destination application 118. If cognitive bias determination and modeling program 200 determines clipboard 114 is active (decision 218, yes branch), then cognitive bias determination and modeling program 200 determines information associated with the cut, copy and/or paste function (step 212). Cognitive bias determination and modeling program 200 determines clipboard 114 is inactive when application software such as source application 116 and destination application 118 are closed (e.g., programs that utilize clipboard 114 are closed, client device 110 is shutdown, or user selects to exit cognitive bias determination and modeling program 200). Once cognitive bias determination and modeling program 200 determines clipboard 114 is inactive, cognitive bias determination and modeling program 200 stores user models 122 based on the information gathered within the user session. Upon the next activation of cognitive bias determination and modeling program 200, new and updated user models 122 from previous user sessions, are available as existing user models 122. For example, a new user initiates cognitive bias determination and modeling program 200 which then creates a new user models 122 or works with a similar existing user models 122. Cognitive bias determination and modeling program 200 then saves a version of the new user models 122 or modified similar existing user models 122 with identifying information for the new user within a repository of tailored existing user models 122. The new user initiates a new user session with cognitive bias determination and modeling program 200. Cognitive bias determination and modeling program 200 recognizes the new user (i.e., user is no longer new) and applies the appropriate existing user models 122. If cognitive bias determination and modeling program 200 determines clipboard 114 is inactive (decision 218, no branch), cognitive bias determination and modeling program 200 analyzes user models 122 to form groups (step 220).

As subsequent iterations of cognitive bias determination and modeling program 200 occur (i.e., steps 212 through 218) based on continuing actions made by the user, cognitive bias and determination modeling program 200 incorporates additional interactions with clipboard 114 into user models 122 (e.g., within a user session, multiple cut, copy, and paste functions may occur across a multitude of applications). For example, a user receives an e-mail inquiring availability, cost, and vendor information for a part number. The user first selects and copies the parts number from the e-mail (e.g., source application 116) to clipboard 114 and then pastes the parts number in the search website (e.g., destination application 118). Once results are returned, the user copies the relevant information from the results to clipboard 114, and cognitive bias determination and modeling program 200 updates source application 116 to be the accessed website. The user then pastes the information on clipboard 114 into a spreadsheet program, and cognitive bias determination and modeling program 200 updates destination application 118 to be the spreadsheet program. Cognitive bias determination and modeling program 200 stores the transferred information with the corresponding actions within source application 116 and destination application 118. The user may then continue to alternate between website search results and the spreadsheet program, performing multiple cut, copy, and/or paste actions that build a table of relevant information and further defines user models 122. Cognitive bias and determination model program 200 creates user models 122, starting with the initial cut and/or copy and paste actions, and potentially creates a more comprehensive version of user models 122 as further actions are performed (e.g., additional data acquired for analysis may provide further information pertaining to user biases).

In step 220, cognitive bias determination and modeling program 200 analyzes user models 122 to form groups. Cognitive bias determination and modeling program 200 compares the utilizations of source application 116, destination application 118, and the content of the information transferred via clipboard 114 to form groups of similar user models 122 (e.g., cluster analysis, Markov process, etc.). Cognitive bias determination and modeling program 200 may identify states, features, and relationships between contents and users associated with user models 122 to facilitate group development. For example, a team of ten users presented with information to research and report upon. The ten users utilize Web browsers and search utilities to acquire information however, two users create presentations, three users create word processing documents, and five users create spreadsheets. Based on the analysis, cognitive bias determination and modeling program 200, creates three groups of user models 122 (e.g., presentation, word processing document, and spreadsheet). Cognitive bias determination and modeling program 200 may additionally associate the groups with preferred learning styles. For example the presentation group relates to visual learners (i.e., learn though graphs, pictures, and diagrams), the word processing document relates to verbal learns (i.e., learn through hearing or reading information), and the spreadsheet group relates to sequential learners (i.e., learn linearly in an orderly manner).

In step 220, cognitive bias determination and modeling program 200 analyzes the groups for similar user demographics. Cognitive bias determination and modeling program 200 compares the user information associated with user models 122 within the groups to create subgroups. For example, cognitive bias determination and modeling program 200 may assess the job roles of the ten users for similarities, as job roles may impact the manner in which information is utilized by a user. The two users associated with presentations are sales and marketing representatives, the three users creating the word processing document are technical writers, and the five users associated with the spreadsheets are engineers and program analysts. In another embodiment when provided, cognitive bias determination and modeling program 200 may additionally identify similar user demographic information within the groups forming additional subgroups. For example, cognitive bias determination and modeling program 200 determines similarities based on levels of education, years in industry, age groups, gender, etc.

After the completion of cognitive bias determination and modeling program 200, additional users may review the information provided by user models 122 (e.g., groups characteristics). For example the manager of a department may review user models 122 to determine learning styles. The manager may then modify the manner in which future information is presented to a group of individuals based upon the best suited learning style for the audience. The manager may also utilize the learning styles to create a team of users with varying or similar learning styles to achieve goals based on perceived needs. Additionally cognitive bias determination and modeling program 200 stores the new and/or updated user models 122 for future assignment to additional users.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
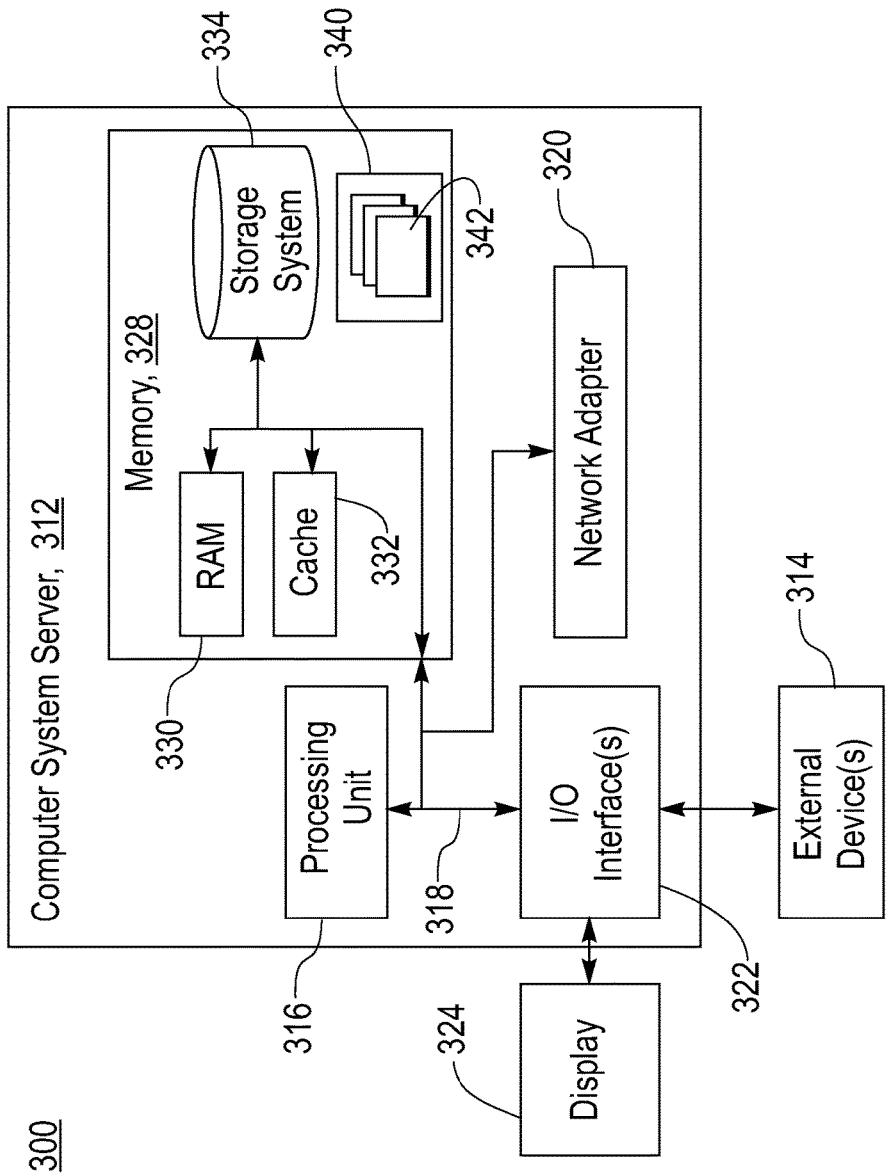
FIG. 3 depicts a cloud computing node executing the cognitive bias determination and modeling program in accordance with an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 30 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
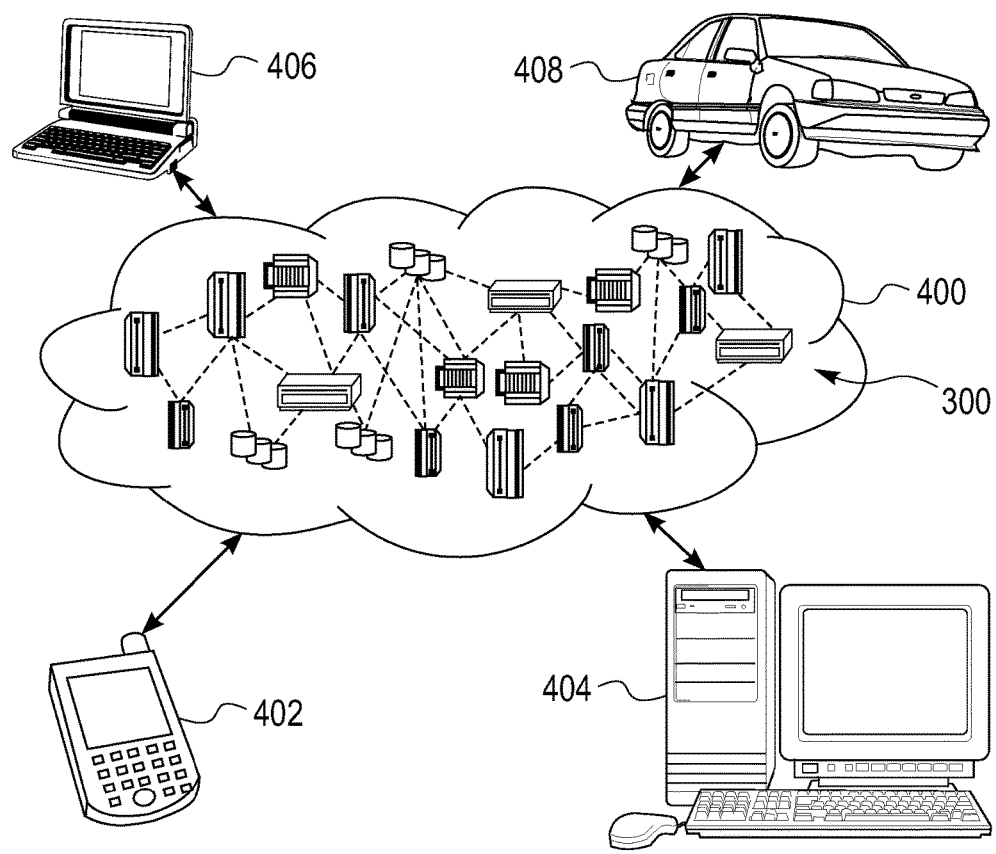
FIG. 4 depicts a cloud computing environment in accordance with an embodiment of the present invention.

Referring now to FIG. 4, illustrative cloud computing environment 400 is depicted. As shown, cloud computing environment 400 comprises one or more cloud computing nodes 300 with which local computing devices used by cloud consumers, such as, for example, personal digital assistant (PDA) or cellular telephone 402, desktop computer 404, laptop computer 406, and/or automobile computer system 408 may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 402-408 shown in FIG. 4 are intended to be illustrative only and that computing nodes 300 and cloud computing environment 400 can communicate with any type of computerized device over any type of network and/or network addressable connection (e.g., using a web browser).

Figure 5:
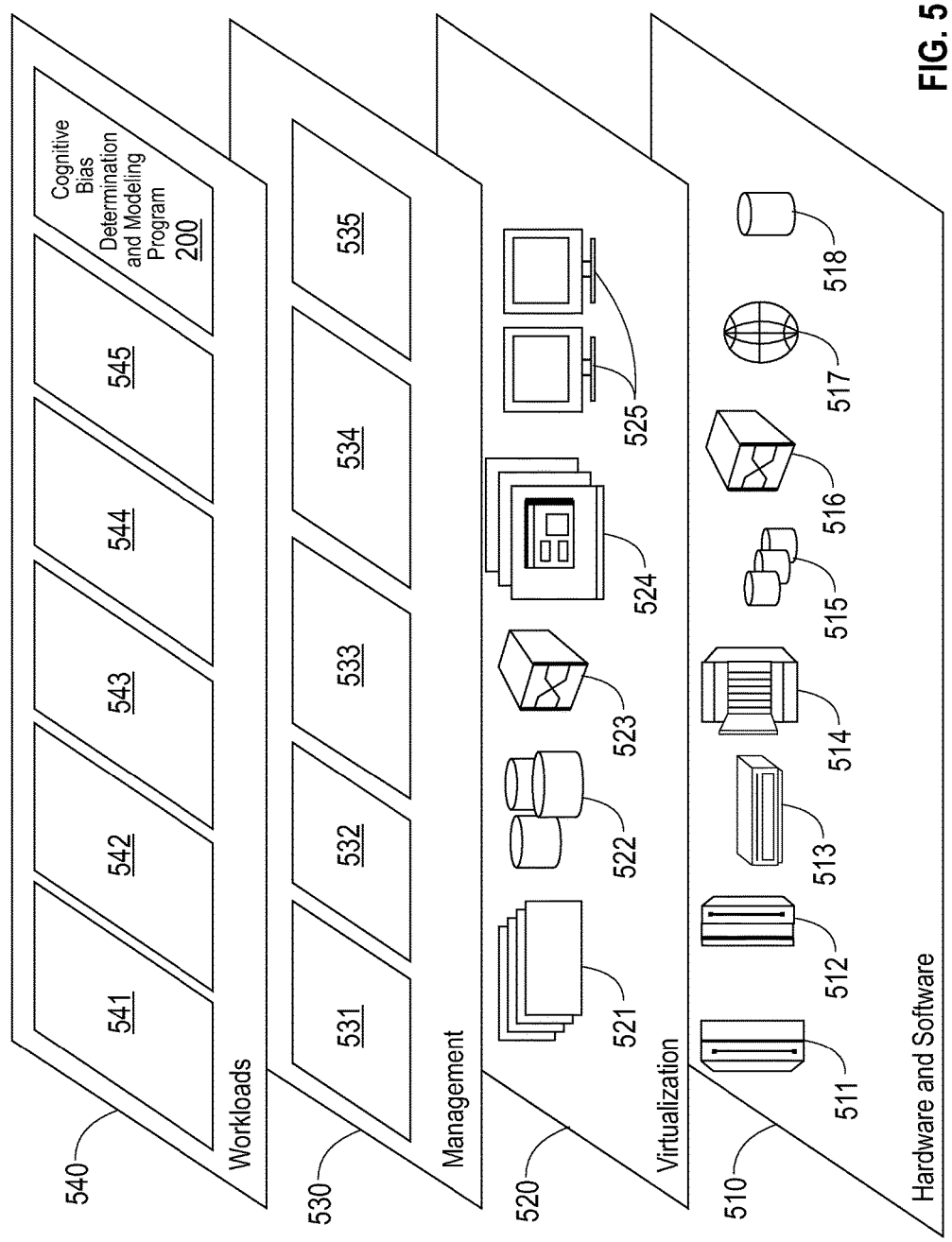
FIG. 5 depicts abstraction model layers in accordance with an embodiment of the present invention.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include: mapping and navigation 541; software development and lifecycle management 542; virtual classroom education delivery 543; data analytics processing 544; transaction processing 545; and cognitive bias determination and modeling program 200.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a preferred learning style of the user, the method comprising:
   receiving, by one or more computer processors, user information of a user;
   collecting, by the one or more computer processors, data for user model development, wherein the data for the user model development includes actions performed by the user wherein the actions are selected from the group consisting of: copying, cutting, and pasting information on a clipboard;
   creating, by the one or more computer processors, one or more associations between the actions in the data for the user model development and the user information, wherein the one or more associations identify a first application software as a source application software based on the one or more associations between the actions in the data including one of: the cutting and the copying information to the clipboard and a second application software as a destination application software based on the one or more associations between the actions in the data with the pasting of the information from the clipboard, and a utilization of the information associated with the actions for the user;
   determining, by the one or more computer processors, a preferred learning style of the user based on the one or more associations, wherein the preferred learning style is selected from the group consisting of: visual, verbal, active sequential, and intuitive;
   creating, by the one or more computer processors, a new user model for the user based on the one or more associations between the actions in the data for the user model development, the user information, and the preferred learning style of the user;
   identifying, by the one or more computer processors, at least one user within the one or more existing user models that includes the preferred learning style of the user;
   determining, by the one or more computer processors, a user model from the one or more existing user models that is associated with the user information;
   applying, by the one or more computer processors, the user model from the one or more existing user models to modify information within a user interface of a computing device that is displayed to the user based on the preferred learning style; and
   wherein the user model from the one or more existing user models modifies a presentation of information within the user interface to the user comprising learning styles, user preferences, the user information, user states, features, and relationships between content and users based on the source application software, content, the destination application software, and the utilization of the information as provided through the actions performed by the user.

2. The method of claim 1, wherein receiving the user information of the user further comprises:
   receiving, by the one or more computer processors, the user information of the user that comprises one or more of: the demographic information and public user information;
   wherein the demographic information includes an age range, a gender, an education level, and a profession associated with the user; and
   wherein the public user information includes a job role, a job title, a department, and a peer group associated with the user.

3. The method of claim 1, wherein determining the user model from the one or more existing user models that is associated with the user information further comprises:
   determining, by the one or more computer processors, whether the user information of the user matches stored existing user information associated with the user model from the one or more existing user models;
   responsive to determining the user information matches the stored existing user information associated with the user model from the one or more existing user models, retrieving, by the one or more computer processors, the user model associated with the stored existing user information that matches the user information; and
   updating, by the one or more computer processors, the user model associated with the stored existing user information that matches the user information based on the new user model.

4. The method of claim 1, wherein determining the user model from the one or more existing user models that is associated with the user information further comprises:

determining, by the one or more computer processors, whether the user information of the user matches stored existing user information associated with the user model from the one or more existing user models;

responsive to determining the user information of the user does not match the stored existing user information associated with the user model from the one or more existing user models, determining, by the one or more computer processor, the stored existing user information wherein the stored user information is one stored existing user information selected from a group consisting of: demographic information and public user information that matches one or more of the demographic information and the public user information associated with the user information, demographic information and public user information that matches one or more of the demographic information associated with the user information, demographic information and public user information that matches one or more of the public user information associated with the user information, demographic information that matches one or more of the demographic information associated with the user information, and public user information that matches one or more of the public user information associated with the user information; and selecting, by the one or more computer processors, the user model that is associated with the stored existing user information that matches the one or more of: the demographic information and the public user information associated with the user information.

5. The method of claim 1, wherein collecting the data for the user model development further comprises:

determining, by the one or more computer processors whether the clipboard is active;

responsive to determining that the clipboard is active; identifying, by the one or more computer processors the first application software that is active based on a first user action that includes initiation of one of: the copying and the cutting;

determining, by the one or more computer processors, information within the first application software that is selected through the first user action, in which the information is placed on the clipboard, wherein the information includes one of: a text, an image, and a hyperlink;

storing, by the one or more computer processors, the information placed on the clipboard and a type of program associated with the first application software associated with the first user action;

determining, by the one or more computer processors, that the information placed on the clipboard is transferred from the clipboard through a second user action to the second application software, wherein the second user action is the pasting; and storing, by the one or more computer processors, the utilization of the information transferred from the clipboard within the second application software and a type of program associated with the second application software associated with the second user action, wherein the utilization identifies the placement of the information within the second application software and a manner of use.

6. The method of claim 1, wherein determining the preferred learning style of the user based on the one or more associations further comprises:

extracting, by the one or more computer processors, features from the data for the user model development;

identifying, by the one or more computer processors, semantic and syntactic information associated with the features based at least in part on language resources that include knowledge bases and lexical resources;

identifying, by the one or more computer processors, a cluster based on the semantic and syntactic information;

identifying, by the one or more computer processors, salient topics based on the cluster; and applying, by the one or more computer processors, a density model to the salient topics to determine the preferred learning style, wherein the density model determines a cluster density based on a density of the cluster relative to a principle word.

7. A computer program product for determining a preferred learning style of the user, the computer program product comprising:

one or more computer readable storage media and program instructions stored on the one or more computer readable storage media, the program instructions comprising:

the program instructions to receive user information of a user;

the program instructions to collect data for user model development, wherein the data for the user model development includes actions performed by the user, wherein the actions are selected from the group consisting of: copying, cutting, and pasting the information on a clipboard;

the program instructions to create one or more associations between the actions in the data for the user model development and the user information, wherein the one or more associations identify a first application software as a source application software based on the one or more associations between the actions in the data including one of: the cutting and the copying information to the clipboard and a second application software as a destination application software based on the one or more associations between the actions in the data with the pasting of the information from the clipboard, and a utilization of the information associated with the actions for the user;

the program instructions to determine a preferred learning style of the user based on the one or more associations, wherein the preferred learning style is selected from the group consisting of: visual, verbal, active sequential, and intuitive;

the program instructions to create a new user model for the user based on the one or more associations between the actions in the data for the user model development, the user information, and the preferred learning style of the user;

the program instructions to identify at least one user within the one or more existing user models that includes the preferred learning style of the user;

the program instructions to determine a user model from the one or more existing user models that is associated with the user information;

the program instructions to apply the user model from the one or more existing user models to modify information within a user interface of a computing device that is displayed to the user based on the preferred learning style; and wherein the user model from the one or more existing user models modifies a presentation of information within the user interface to the user comprising learning styles, user preferences, the user information, user states, features, and relationships between content and users based on the source application software, content, the destination application software, and the utilization of the information as provided through the actions performed by the user.

8. The computer program product of claim 7, wherein receiving the user information further comprises the program instructions, stored on the one or more computer readable storage media, to:
receive the user information of the user that comprises one or more of the demographic information and public user information;
wherein the demographic information includes an age range, a gender, an education level, and a profession associated with the user; and
wherein the public user information includes a job role, a job title, a department, and a peer group associated with the user.

9. The computer program product of claim 7, wherein determining the user model from the one or more existing user models that is associated with the user information further comprises the program instructions, stored on the one or more computer readable storage media, to:
determine whether the user information matches stored existing user information associated with the user model from the one or more existing user models; and
responsive to determining the user information matches the stored existing user information associated with the user model from the one or more existing user models, retrieve the user model associated with the stored existing user information that matches the user information; and
update the user model associated with the stored existing user information that matches the user information based on the new user model.

10. The computer program product of claim 7, wherein determining the user model from the one or more existing user models that is associated with the user information further comprises the program instructions, stored on the one or more computer readable storage media, to:
determine whether the user information matches stored existing user information associated with the user model from the one or more existing user models;
responsive to determining the user information of the user does not match the stored existing user information associated with the user model from the one or more existing user models, determine the stored existing user information wherein the stored user information is one stored existing user information selected from a group consisting of: demographic information and public user information that matches one or more of the demographic information and the public user information associated with the user information, demographic information and public user information that matches one or more of the demographic information associated with the user information, demographic information and public user information that matches one or more of the public user information associated with the user information, demographic information that matches one or more of the demographic information associated with the user information, and public user information that matches one or more of the public user information associated with the user information; and
select the user model that is associated with the stored existing user information that matches the one or more of: the demographic information and the public user information associated with the user information.

11. The computer program product of claim 7, wherein collecting the data for the user model development further comprises the program instructions, stored on the one or more computer readable storage media, to:
determine whether the clipboard is active;
responsive to determining that the clipboard is active; the first application software that is active based on a first user action that includes initiation of one of: the copying and the cutting;
determine information within the first application software that is selected through the first user action, in which the information is placed on the clipboard, wherein the information includes one of: a text, an image, and a hyperlink;
store the information placed on the clipboard and a type of program associated with the first application software associated with the first user action;
determine that the information placed on the clipboard is transferred from the clipboard through a second user action to the second application software, wherein the second user action is the pasting; and
store the utilization of the information transferred from the clipboard within the second application software and a type of program associated with the second application software associated with the second user action, wherein the utilization identifies the placement of the information within the second application software and a manner of use.

12. The computer program product of claim 7, wherein determining the preferred learning style of the user based on the one or more associations further comprises the program instructions, stored on the one or more computer readable storage media, to:
extract features from the data for the user model development;
identify semantic and syntactic information associated with the features based at least in part on language resources that include knowledge bases and lexical resources;
identify a cluster based on the semantic and syntactic information;
identify salient topics based on the cluster; and
apply a density model to the salient topics to determine the preferred learning style, wherein the density model determines a cluster density based on a density of the cluster relative to a principle word.

13. A computer system for determining a preferred learning style of the user, the computer system comprising:
one or more computer processors, one or more computer readable storage media, and program instructions stored on the computer readable storage media for execution by at least one of the one or more processors, the program instructions comprising:
the program instructions to receive user information of a user;
the program instructions to collect data for user model development, wherein the data for the user model development includes actions performed by the user, wherein the actions are selected from the group consisting of: copying, cutting, and pasting the information on a clipboard;
the program instructions to create one or more associations between the actions in the data for the user model development and the user information, wherein the one or more associations identify a first application software as a source application software based on the one or more associations between the actions in the data including one of: the cutting and the copying information to the clipboard and a second application software as a destination application software based on the one or more associations between the actions in the data with the pasting of the information from the clipboard, and a utilization of the information associated with the actions for the user;

the program instructions to determine a preferred learning style of the user based on the one or more associations, wherein the preferred learning style is selected from the group consisting of: visual, verbal, active sequential, and intuitive;

the program instructions to create a new user model for the user based on the one or more associations between the actions in the data for the user model development, the user information, and the preferred learning style of the user;

the program instructions to identify at least one user within the one or more existing user models that includes the preferred learning style of the user;

the program instructions to determine a user model from the one or more existing user models that is associated with the user information;

the program instructions to apply the user model from the one or more existing user models to modify information within a user interface of a computing device that is displayed to the user based on the preferred learning style; and wherein the user model from the one or more existing user models modifies a presentation of information within the user interface to the user comprising learning styles, user preferences, the user information, user states, features, and relationships between content and users based on the source application software, content, the destination application software, and the utilization of the information as provided through the actions performed by the user.

14. The computer system of claim 13, wherein determining the user model from the one or more existing user models that is associated with the user information further comprises the program instructions, stored on the one or more computer readable storage media, to:

determine whether the user information matches stored existing user information associated with the user model from the one or more existing user models; and responsive to determining the user information matches the stored existing user information associated with the user model from the one or more existing user models, retrieve the user model associated with the stored existing user information that matches the user information; and update the user model associated with the stored existing user information that matches the user information based on the new user model.

15. The computer system of claim 13, determining the user model from the one or more existing user models that is associated with the user information further comprises the program instructions, stored on the one or more computer readable storage media, to:

determine whether the user information matches stored existing user information associated with the user model from the one or more existing user models;

responsive to determining the user information of the user does not match the stored existing user information associated with the user model from the one or more existing user models, determine the stored existing user information wherein the stored user information is one of the stored existing user information selected from a group consisting of: demographic information and public user information that matches one or more of the demographic information and the public user information associated with the user information, demographic information and public user information that matches one or more of the demographic information associated with the user information, demographic information and public user information that matches one or more of the public user information associated with the user information, demographic information that matches one or more of the demographic information associated with the user information, and public user information that matches one or more of the public user information associated with the user information; and select the user model that is associated with the stored existing user information that matches the one or more of: the demographic information and the public user information associated with the user information.

16. The computer system of claim 13, wherein collecting the data for the user model development further comprises the program instructions, stored on the one or more computer readable storage media, to:

determine whether the clipboard is active;

responsive to determining that the clipboard is active; the first application software that is active based on a first user action that includes initiation of one of: the copying and the cutting;

determine information within the first application software that is selected through the first user action, in which the information is placed on the clipboard, wherein the information includes one of: a text, an image, and a hyperlink;

store the information placed on the clipboard and a type of program associated with the first application software associated with the first user action;

determine that the information placed on the clipboard is transferred from the clipboard through a second user action to the second application software, wherein the second user action is the pasting; and store the utilization of the information transferred from the clipboard within the second application software and a type of program associated with the second application software associated with the second user action, wherein the utilization identifies the placement of the information within the second application software and a manner of use.

17. The computer system of claim 13, wherein determining the preferred learning style of the user based on the one or more associations further comprises the program instructions, stored on the one or more computer readable storage media, to:

extract features from the data for the user model development;

identify semantic and syntactic information associated with the features based at least in part on language resources that include knowledge bases and lexical resources;

identify a cluster based on the semantic and syntactic information;

identify salient topics based on the cluster; and apply a density model to the salient topics to determine the preferred learning style, wherein the density model determines a cluster density based on a density of the cluster relative to a principle word.

18. The method of claim 1, further comprises:
forming, by the one or more computer processors, a group that includes the at least one user within the one or more existing user models and the user;
forming, by one or more computer processors, a sub-group within the group based at least in part on demographic information; and
providing, by the one or more computer processors, the preferred learning style of the sub-group in order to create a presentation for the sub-group based on the preferred learning style.

19. The computer program product of claim 7, further comprises the program instructions, stored on the one or more computer readable storage media, to:
the program instructions to form a group that includes the at least one user within the one or more existing user models and the user;
the program instructions to form a sub-group within the group based at least in part on demographic information; and
the program instructions to provide the preferred learning style of the sub-group in order to create a presentation for the sub-group based on the preferred learning style.

20. The computer system of claim 13, wherein determining the preferred learning style of the user based on the one or more associations further comprises the program instructions, stored on the one or more computer readable storage media, to:
the program instructions to form a group that includes the at least one user within the one or more existing user models and the user;
the program instructions to form a sub-group within the group based at least in part on demographic information; and
the program instructions to provide the preferred learning style of the sub-group in order to create a presentation for the sub-group based on the preferred learning style.

* * * * *